Jan. 6, 1925.

R. R. NORRIS 1,521,965

DRIVING MECHANISM FOR SPEEDOMETERS

Filed Jan. 26, 1924

WITNESSES

INVENTOR
Ross R. Norris
BY
ATTORNEYS

Patented Jan. 6, 1925.

1,521,965

UNITED STATES PATENT OFFICE.

ROSS R. NORRIS, OF LAGRANGE, INDIANA.

DRIVING MECHANISM FOR SPEEDOMETERS.

Application filed January 26, 1924. Serial No. 688,797.

*To all whom it may concern:*

Be it known that I, ROSS R. NORRIS, a citizen of the United States, and a resident of Lagrange, in the county of Lagrange and State of Indiana, have invented certain new and useful Improvements in Driving Mechanism for Speedometers, of which the following is a specification.

This invention relates to a driving mechanism for speedometers and is especially adapted for use on Ford cars.

The object of the invention is to provide a driving mechanism for speedometers of this character which is so designed and adapted as to be susceptible of organization with the transmission of the automobile whereby the speedometer is driven from the transmission.

A further object of the invention is to provide a device of this character which is simple and durable in construction and adapted to be manufactured and installed at a comparatively slight expense and without interfering in any way with the normal functioning of the transmission.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 3:
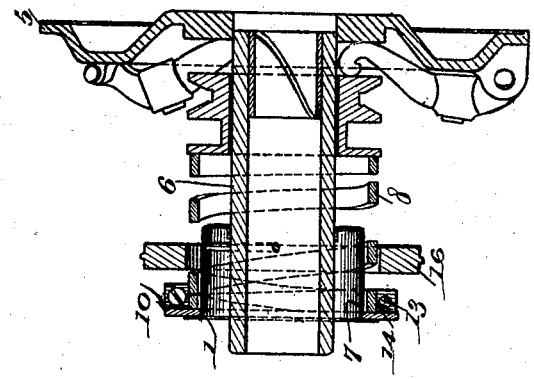
Figure 3 is a view in longitudinal section on line 3—3 of Figure 1.
Figure 2:
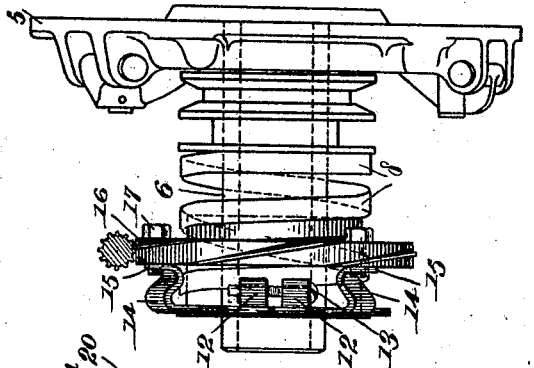
Figure 2 is a view in side elevation of the parts shown in Figure 1 but showing the worm of the driving mechanism in section.
Figure 1:
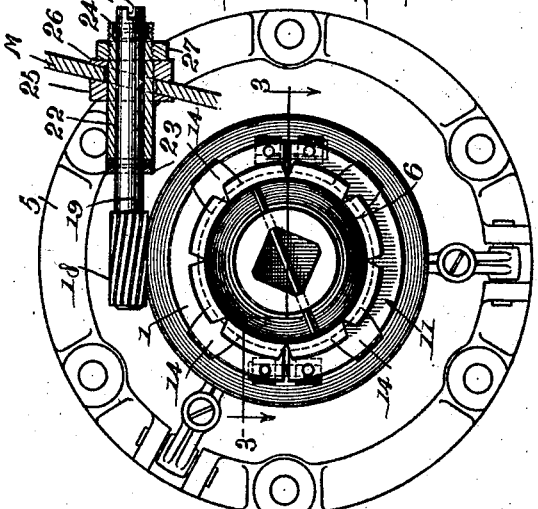
Figure 1 is an end view of the driven member and driving plate and associated parts of a "Ford" transmission detached from the assembly and showing my invention applied thereto, parts of the invention being shown in section for the sake of illustration.

Referring to the drawings wherein for the sake of illustration is shown the preferred embodiment of the invention, the numeral 5 designates the driving plate of a "Ford" transmission, which driving plate is fixed as usual to the clutch drum (not shown) and which is keyed or otherwise suitably fixed to the driven member 6. On the driven member 6 a fixed abutment or collar 7 is provided for the clutch spring 8. These parts are conventional in "Ford" transmission and of themselves and per se form no part of this invention.

On the fixed abutment 7 which it will be understood rotates with the driven member 6, a gear mounting or bracket designated generally at 10 is provided. This gear mounting comprises a pair of semi-annular sections 11 having opposed lugs 12 provided with internally threaded openings and cooperable with clamping screws 13 whereby the semi-annular sections may be fixedly secured to the abutment 7 and consequently to the driven member 6. A plurality of offset and reversely curved lugs 14 are carried by the bracket and may be integrally formed therewith or welded or otherwise suitably secured thereto. These lugs 14 have offset portions 15 extending substantially parallel to the semi-annular sections 11 and provided with internally threaded apertures.

A driving gear member 16 is provided and is shown in this embodiment as consisting of a worm wheel of triangular form. If found desirable this worm wheel may be made up of a number of sections to facilitate assembly. The body portion of the worm wheel 16 is transversely apertured in order to accommodate supporting screws 17 which extend through the apertures of the worm wheel and which are threaded into the openings of the portions 15 of the lugs 14. A driven gear member 18 which is shown as a worm, is meshed with the driving gear member 16 and is fixedly mounted on a driven shaft 19. This shaft 19 projects exteriorly of the transmission housing or casing, the housing or casing having a suitable opening accommodating this shaft. The end of the shaft 19 which is disposed exteriorly of the transmission casing is slotted or otherwise adapted, as at 20, for coupling with the flexible shaft. The flexible shaft is not shown and may be of any suitable type and extends to the speedometer whereby the speedometer is driven from the shaft 19. The shaft 19 is preferably mounted in a sleeve bearing 22 and is held against endwise movement by collars 23 and 24 pinned to the shaft and engageable with the sleeve 22. It is to be understood of course that the collars 23 and 24 do not interfere with rotary motion of the shaft 19. The sleeve bearing 20 has a fixed abutment 25 secured thereto and engageable with one side of the transmission housing T. The movable abutment 26 is engageable with the opposite side of the housing and is urged into clamping engagement therewith by a nut 27 threaded onto the sleeve 22. If desired suitable packing may be employed to prevent leakage of oil or grease from the transmission housing. The faces of the abutments 25 and 26 which engage the transmission housing have a suitable inclination to compensate for the inclination of the housing. It is to be understood that the shaft 19 can be suitably journaled in a bracket member independent of the housing if this is considered desirable.

In operation, the driving gear member 16 of the speedometer driving mechanism is rotated at the same rate of speed as the driven member at all times and in all gear adjustments. The driving gear member 16 being directly meshed with the driven gear member 18 which is fixed to the shaft 19 serves to accurately drive the speedometer at all times since the shaft 19 is coupled with the flexible shaft ordinarily employed for transmitting the motion to the speedometer. With this arrangement all swiveled joints now employed are eliminated. The length of the flexible shaft is greatly reduced and the necessity for using the road gear or fiber gear attached to the front wheel of the machine is obviated. In addition to this the driving and driven gear elements being disposed within the transmission housing are immersed in oil and thereby provide for noiseless operation and enhanced durability.

I claim:

1. A speedometer driving mechanism for use with motor vehicles having a transmission including a driven member, a fixed abutment secured thereto and a casing, said speedometer driving mechanism including a gear mounting consisting of semi-annular sections clamped on said abutment, lugs carried by said sections, an annular worm wheel secured to said lugs, a worm meshed with said worm wheel, and a shaft carrying said worm, and journaled in the transmission casing, said shaft being adapted to be connected with the speedometer for driving the same.

2. A speedometer driving mechanism for use with motor vehicles having a transmission including a driven member, a fixed abutment secured thereto and a casing, said speedometer driving mechanism including a gear mounting consisting of semi-annular sections clamped on said abutment, lugs carried by said sections, an annular worm wheel secured to said lugs, a worm meshed with said worm wheel, a shaft carrying said worm, a sleeve bearing for said shaft, a fixed abutment secured to the sleeve bearing and engaging the transmission casing, a movable abutment opposed to the fixed abutment and also engaging the transmission casing and a nut threaded on the sleeve and urging the movable abutment into engagement with the transmission casing, said shaft being adapted to be connected with the speedometer for driving the same.

ROSS R. NORRIS.